US012556858B2

(12) United States Patent
Chen et al.

(10) Patent No.: US 12,556,858 B2
(45) Date of Patent: Feb. 17, 2026

(54) METHODS OF MAKING SIDE-PORT MICROELECTROMECHANICAL SYSTEM MICROPHONES

(71) Applicant: SKYWORKS SOLUTIONS, INC., Irvine, CA (US)

(72) Inventors: Guofeng Chen, Fremont, CA (US); Michael Jon Wurtz, Lake Oswego, OR (US); Rakesh Kumar, Singapore (SG); You Qian, Singapore (SG); Humberto Campanella-Pineda, Singapore (SG)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 85 days.

(21) Appl. No.: 18/170,598

(22) Filed: Feb. 17, 2023

(65) Prior Publication Data

US 2023/0269525 A1 Aug. 24, 2023

Related U.S. Application Data

(60) Provisional application No. 63/311,524, filed on Feb. 18, 2022.

(51) Int. Cl.

| | |
|---|---|
| ***H04R 1/28*** | (2006.01) |
| ***H04R 1/04*** | (2006.01) |
| ***H04R 1/22*** | (2006.01) |
| ***H04R 3/00*** | (2006.01) |
| ***H04R 17/02*** | (2006.01) |

(52) U.S. Cl.

CPC ............ *H04R 1/2807* (2013.01); *H04R 1/04* (2013.01); *H04R 1/222* (2013.01); *H04R 3/00* (2013.01); *H04R 17/02* (2013.01); *H04R 2201/003* (2013.01); *H04R 2499/11* (2013.01)

(58) Field of Classification Search

CPC ........ H04R 1/342; H04R 1/2807; H04R 1/04; H04R 1/222; H04R 3/00; H04R 17/02; H04R 2201/003; H04R 2499/11; H04R 31/00; B81B 7/0061; B81B 2201/0257

See application file for complete search history.

(56) References Cited

U.S. PATENT DOCUMENTS

| | | | | |
|---|---|---|---|---|
| 4,631,749 A | 12/1986 | Rapaich | | |
| 8,204,252 B1 | 6/2012 | Avendano | | |
| 8,254,619 B2 * | 8/2012 | Yeh | H04R 19/005 381/361 | |
| 8,351,634 B2 | 1/2013 | Khenkin | | |

(Continued)

FOREIGN PATENT DOCUMENTS

| | | | | |
|---|---|---|---|---|
| CN | 106921928 A | 7/2017 | | |
| GB | 2582386 A * | 9/2020 | B81B 7/0032 | |
| WO | 2015013698 A1 | 1/2015 | | |

*Primary Examiner* — Carolyn R Edwards
*Assistant Examiner* — Kuassi A Ganmavo
(74) *Attorney, Agent, or Firm* — Lando & Anastasi, LLP

(57) ABSTRACT

A side-port piezoelectric microelectromechanical system microphone package includes a microelectromechanical system die disposed on the microphone substrate and including a microphone membrane and a membrane support substrate, the microphone membrane being disposed on a wall of a membrane support substrate, and an acoustic port defined by an aperture passing through a portion of the wall of the membrane support substrate.

17 Claims, 16 Drawing Sheets

(56) References Cited

U.S. PATENT DOCUMENTS

| | | | | |
|---|---|---|---|---|
| 8,618,619 | B1 * | 12/2013 | Miks | B81B 7/0061 438/51 |
| 9,813,833 | B1 | 11/2017 | Vesa | |
| 2003/0133588 | A1 | 7/2003 | Pedersen | |
| 2005/0254673 | A1 | 11/2005 | Hsieh et al. | |
| 2010/0128914 | A1 * | 5/2010 | Khenkin | H04R 19/005 381/361 |
| 2010/0183174 | A1 * | 7/2010 | Suvanto | H04R 19/04 381/174 |
| 2010/0254547 | A1 | 10/2010 | Grosh et al. | |
| 2011/0018076 | A1 | 1/2011 | Pahl et al. | |
| 2011/0243343 | A1 | 10/2011 | Gauger, Jr. et al. | |
| 2011/0272769 | A1 | 11/2011 | Song et al. | |
| 2012/0124743 | A1 * | 5/2012 | Hensley | A61G 7/0524 5/600 |
| 2012/0241937 | A1 | 9/2012 | Chan et al. | |
| 2012/0250925 | A1 | 10/2012 | Lillelund | |
| 2013/0051598 | A1 * | 2/2013 | Reining | B81B 7/0061 381/355 |
| 2014/0037115 | A1 | 2/2014 | Vos et al. | |
| 2014/0044297 | A1 | 2/2014 | Loeppert et al. | |
| 2014/0233756 | A1 | 8/2014 | Inoda | |
| 2015/0289045 | A1 | 10/2015 | Khenkin et al. | |
| 2016/0043664 | A1 | 2/2016 | Theuss et al. | |
| 2016/0165358 | A1 * | 6/2016 | Ho | H04R 1/021 257/416 |
| 2016/0178372 | A1 | 6/2016 | Pun et al. | |
| 2016/0234604 | A1 * | 8/2016 | Saxena | H04R 1/06 |
| 2017/0048623 | A1 | 2/2017 | Qutub et al. | |
| 2017/0081179 | A1 * | 3/2017 | Dawson | B81B 7/0048 |
| 2017/0094402 | A1 * | 3/2017 | Pahl | H04R 19/04 |
| 2017/0320726 | A1 * | 11/2017 | Leitgeb | B81B 7/0061 |
| 2017/0374441 | A1 * | 12/2017 | Hoekstra | H04R 1/04 |
| 2018/0167742 | A1 | 6/2018 | Brioschi et al. | |
| 2018/0234751 | A1 * | 8/2018 | Lee | B81B 7/0041 |
| 2018/0244516 | A1 * | 8/2018 | Piechocinski | B81B 7/0029 |
| 2018/0297834 | A1 * | 10/2018 | Renaud-Bezot | B81B 7/0064 |
| 2018/0317021 | A1 | 11/2018 | Dehe et al. | |
| 2019/0017893 | A1 | 1/2019 | Tumpold | |
| 2020/0007992 | A1 | 1/2020 | Koymen et al. | |
| 2020/0017351 | A1 * | 1/2020 | Schultz | B67D 7/365 |
| 2020/0084550 | A1 * | 3/2020 | Chiang | H04R 31/006 |
| 2020/0092658 | A1 * | 3/2020 | Zou | H04R 19/005 |
| 2020/0304923 | A1 * | 9/2020 | Brioschi | H04R 19/005 |
| 2020/0404407 | A1 | 12/2020 | Hrudey et al. | |
| 2021/0329378 | A1 | 10/2021 | Zhang et al. | |
| 2021/0400366 | A1 | 12/2021 | LoPresti et al. | |
| 2022/0276149 | A1 | 9/2022 | Kuyken et al. | |
| 2023/0061686 | A1 | 3/2023 | Wolfl | |
| 2023/0121053 | A1 | 4/2023 | Campanella-Pineda et al. | |
| 2023/0217179 | A1 | 7/2023 | Liu | |
| 2023/0269524 | A1 | 8/2023 | Chen et al. | |
| 2023/0283963 | A1 | 9/2023 | Chen et al. | |
| 2023/0328426 | A1 | 10/2023 | Campanella-Pineda et al. | |

* cited by examiner

STEP 1: AN ETCHING MASK IS FORMED AT THE BACK OF WAFER (4 MICROPHONES ARE SHOWN).

STEP 2: SLOPED ETCHING OF SILICON UNTIL THE MICROPHONE MEMBRANES ARE EXPOSED

METHODS OF MAKING SIDE-PORT MICROELECTROMECHANICAL SYSTEM MICROPHONES

CROSS-REFERENCE TO RELATED APPLICATIONS

This application claims priority under 35 U.S.C. § 119(e) to U.S. Provisional Patent Application Ser. No. 63/311,524, titled "METHODS OF MAKING SIDE-PORT MICRO-ELECTROMECHANICAL SYSTEM MICROPHONES," filed Feb. 18, 2022, the entire content of which is incorporated herein by reference for all purposes.

BACKGROUND

Technical Field

Embodiments disclosed herein relate to piezoelectric microelectromechanical system microphone packages and to devices including same.

Description of Related Technology

A microelectromechanical system (MEMS) microphone is a micro-machined electromechanical device to convert sound pressure (e.g., voice) into an electrical signal (e.g., voltage). MEMS microphones are widely used in mobile devices such as cellular telephones, headsets, smart speakers, and other voice-interface devices/systems. Capacitive MEMS microphones and piezoelectric MEMS microphones (PMMs) are both available in the market. PMMs requires no bias voltage for operation, therefore, they provide lower power consumption than capacitive MEMS microphones. The single membrane structure of PMMs enable them to generally provide more reliable performance than capacitive MEMS microphones in harsh environments. Existing PMMs are typically based on either cantilever MEMS structures or diaphragm MEMS structures.

Some of the important parameters to consider in the design of a PMM include performance parameters such as SNR (signal to noise ratio), bandwidth (related to frequency response flatness), size, and cost.

Choosing a location for the MEMS microphone in a product design can be challenging. The design engineer must consider the available board space, component height restrictions, port-hole location(s), acoustic path dimensions, and gasket size, location, and ease-of-assembly in mass production when choosing a microphone location.

The external acoustic port hole in the housing of a device including a PMM should be located near the PMM to simplify the gasket structure and associated mechanical design. The port hole should also be far enough from speakers and other acoustic noise sources to minimize the strength of these unwanted signals at the PMM input.

An acoustic path is typically included in casing or package of a device including a PMM that guides external sound into the PMM. The overall frequency response of the PMM in the product design is determined by the standalone PMM frequency response and the physical dimensions of each part of the acoustic path, including the case port hole, gasket(s), and port hole, if any, in a printed circuit board upon which the PMM is mounted. The acoustic path should not have leaks that can cause multi-path echoes or noise problems and should be designed for manufacturability.

A short, wide acoustic path has minimal effects on the frequency response of a PMM while a long, narrow path can create peaks in the audio band, potentially causing a "tinny" sound as higher frequencies are amplified. A good acoustic path design gives a flat sensitivity versus frequency response across the target frequency range. The designer should measure the total frequency response of the microphone with its acoustic path and make adjustments if the performance doesn't meet design goals.

SUMMARY

In accordance with one aspect, there is provided a side-port piezoelectric microelectromechanical system microphone package. The package comprises a microelectromechanical system die disposed on the microphone substrate and including a microphone membrane and a membrane support substrate, the microphone membrane being disposed on a wall of a membrane support substrate, and an acoustic port defined by an aperture passing through a portion of the wall of the membrane support substrate.

In some embodiments, the package further comprises a cap die including a cavity and bonded to an upper side of the microelectromechanical system die.

In some embodiments, the cap die is formed of one of a dielectric or a semiconductor material.

In some embodiments, the microelectromechanical system die is disposed on a microphone substrate, an upper surface on the microphone substrate, a cavity in the microelectromechanical system die, and the cavity in the cap die defining a back cavity for the microelectromechanical system microphone.

In some embodiments, the microphone substrate includes a printed circuit board.

In some embodiments, the package further comprises a trench defined in an upper surface of the microphone substrate and defining a portion of an acoustic path from the acoustic port to an environment external to the package.

In some embodiments, the package further comprises an application specific integrated circuit disposed on the microphone substrate within the recess on the microelectromechanical system die.

In some embodiments, the application specific integrated circuit disposed within a recess defined in the upper surface the microphone substrate.

In accordance with another aspect, there is provided a side-port piezoelectric microelectromechanical system microphone package. The package comprises a microphone substrate, a microelectromechanical system die disposed on the microphone substrate and including a microphone membrane and a membrane support substrate, the microphone membrane being disposed on a wall of a membrane support substrate, and an acoustic port including a trench defined in an upper surface of the microphone substrate and extending from a region below and to a side of the microelectromechanical system die to a front cavity of the microelectromechanical system microphone.

In some embodiments, the package further comprises a cap die including a cavity and bonded to an upper side of the microelectromechanical system die.

In some embodiments, the cap die is formed of one of a dielectric or a semiconductor material.

In some embodiments, the upper surface on the microphone substrate, a cavity in the microelectromechanical system die, and the cavity in the cap die define a back cavity for the microelectromechanical system microphone.

In some embodiments, the microphone substrate includes a printed circuit board.

In some embodiments, the package further comprises an application specific integrated circuit disposed on the microphone substrate within the recess on the microelectromechanical system die.

In some embodiments, the application specific integrated circuit disposed within a recess defined in the upper surface the microphone substrate.

In some embodiments, the package is included in an electronics device module.

In some embodiments, the electronics device module is included in an electronic device.

In some embodiments, the electronics device module is included in a telephone.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
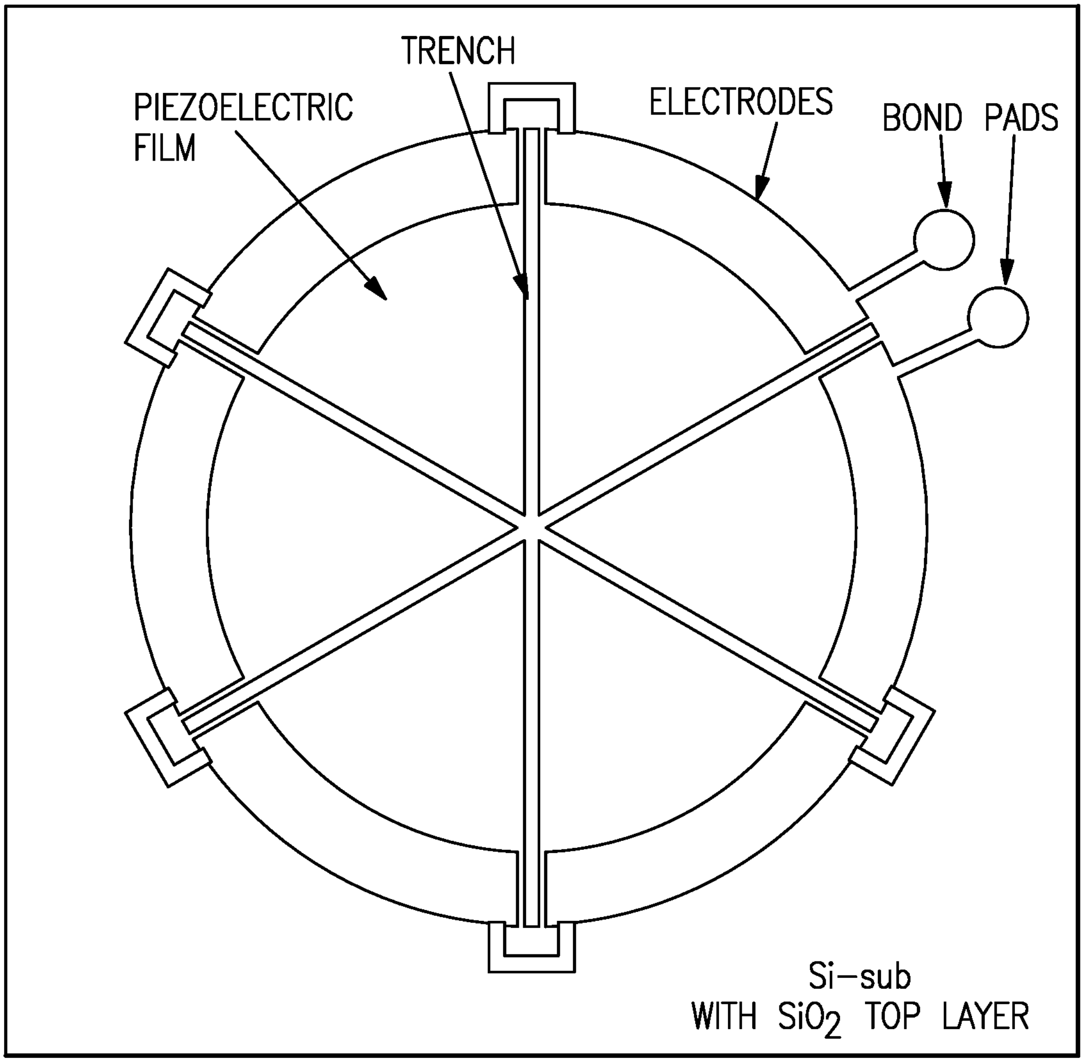
FIG. 1A is a plan view of an example of a cantilever piezoelectric microelectromechanical system microphone (PMM)

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects and embodiments disclosed herein involve engineering of the packaging and assembly of a PMM to provide for an acoustic port on a side of the PMM package to increase flexibility in placement of the PMM package in an electronic device.

Figure 1B:
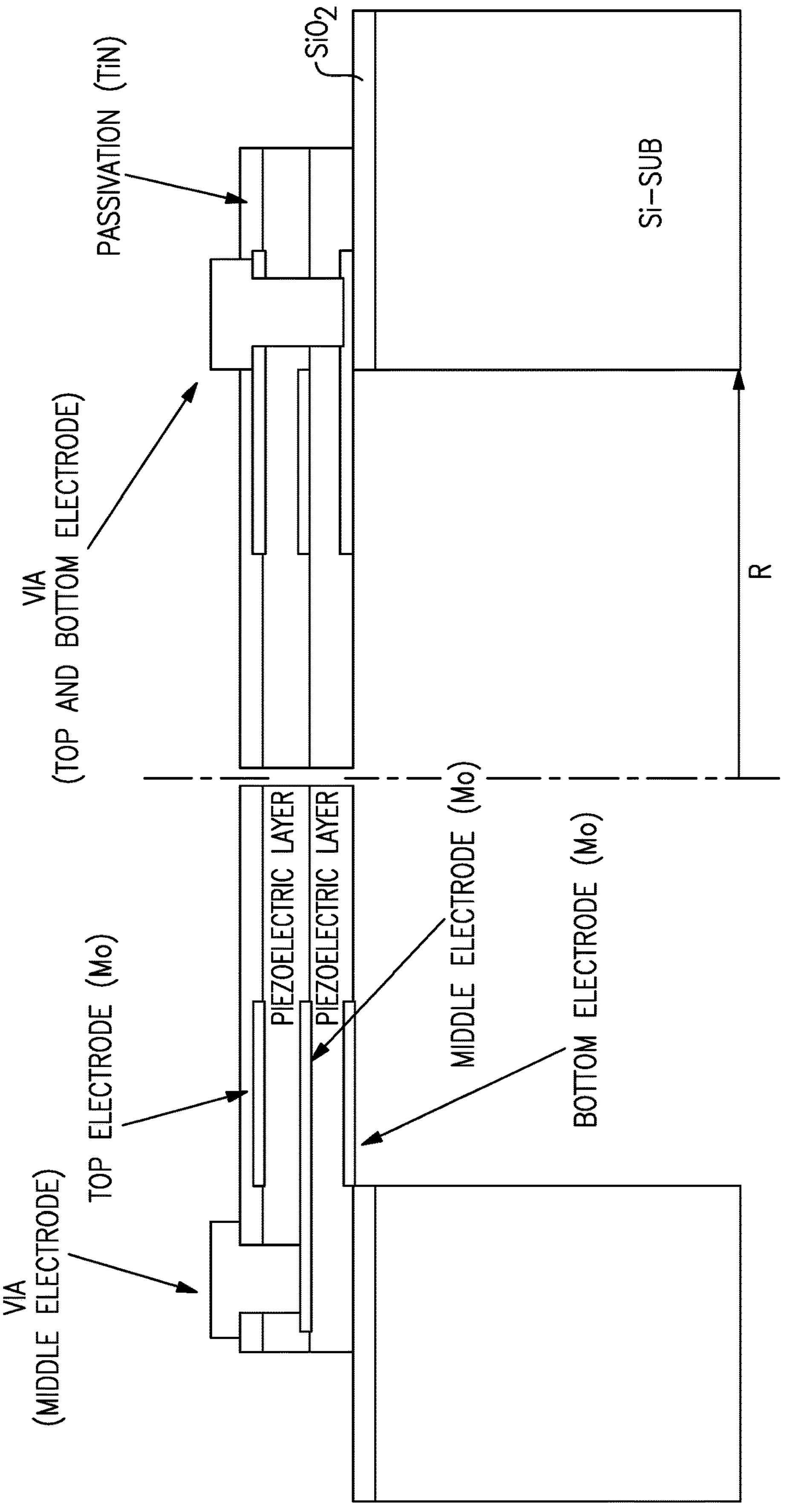
FIG. 1B is a cross-sectional view of the cantilever PMM of FIG. 1A.

One example of a cantilever PMM is illustrated in a plan view in FIGS. 1A and 1*n* a cross-sectional view in FIG. 1B. The cantilever PMM includes six cantilevers and top, middle, and bottom sensing/active electrodes proximate the bases of the cantilevers. Cantilever MEMS microphone structures generate the maximum stress and piezoelectric charges near the edge of the anchor portion of the cantilever structure. Therefore, partial sensing electrodes near the anchor may be used for maximum output energy. The cantilevers are pie-piece shaped and together form a circular microphone structure with trenches (gaps) between adjacent cantilevers. It should be appreciated that in alternate embodiments, the cantilever structures could be shaped other than as illustrated, for example, as polygons with three or more straight or curved sides.

The cantilevers of a cantilever PMM as disclosed herein may have bases mounted on a support substrate including a $SiO_2$ layer on a Si substrate as illustrated in FIG. 1B. The top, bottom, and middle sensing/active electrodes in the different cantilevers are connected in series between the bond pads, except for the cantilevers having electrical connection between the electrodes and bond pads. The top and bottom electrodes of each cantilever are electrically connected to the middle electrode in an adjacent cantilever. Vias to the middle electrode of one cantilever and to the top and bottom electrodes of an adjacent cantilever are used to provide electrical connection between the bond pads and cantilever electrodes. The electrodes are indicated in FIG. 1B as being Mo but could alternatively be Ru or any other suitable metal, alloy, or non-metallic conductive material.

In some embodiments, the layer of $SiO_2$ on the surface of the support substrate upon which the cantilevers formed by the stack of piezoelectric material and electrodes of a PMM is disposed may have a thickness of from about 1 μm to about 5 μm. As illustrated in FIGS. 1A and 1B, the support substrate including the Si substrate and layer of $SiO_2$ typically extends outward beyond the periphery of the PMM piezoelectric material cantilevers. The layer of $SiO_2$ constrains the periphery of the PMM cantilevers.

Figure 2A:
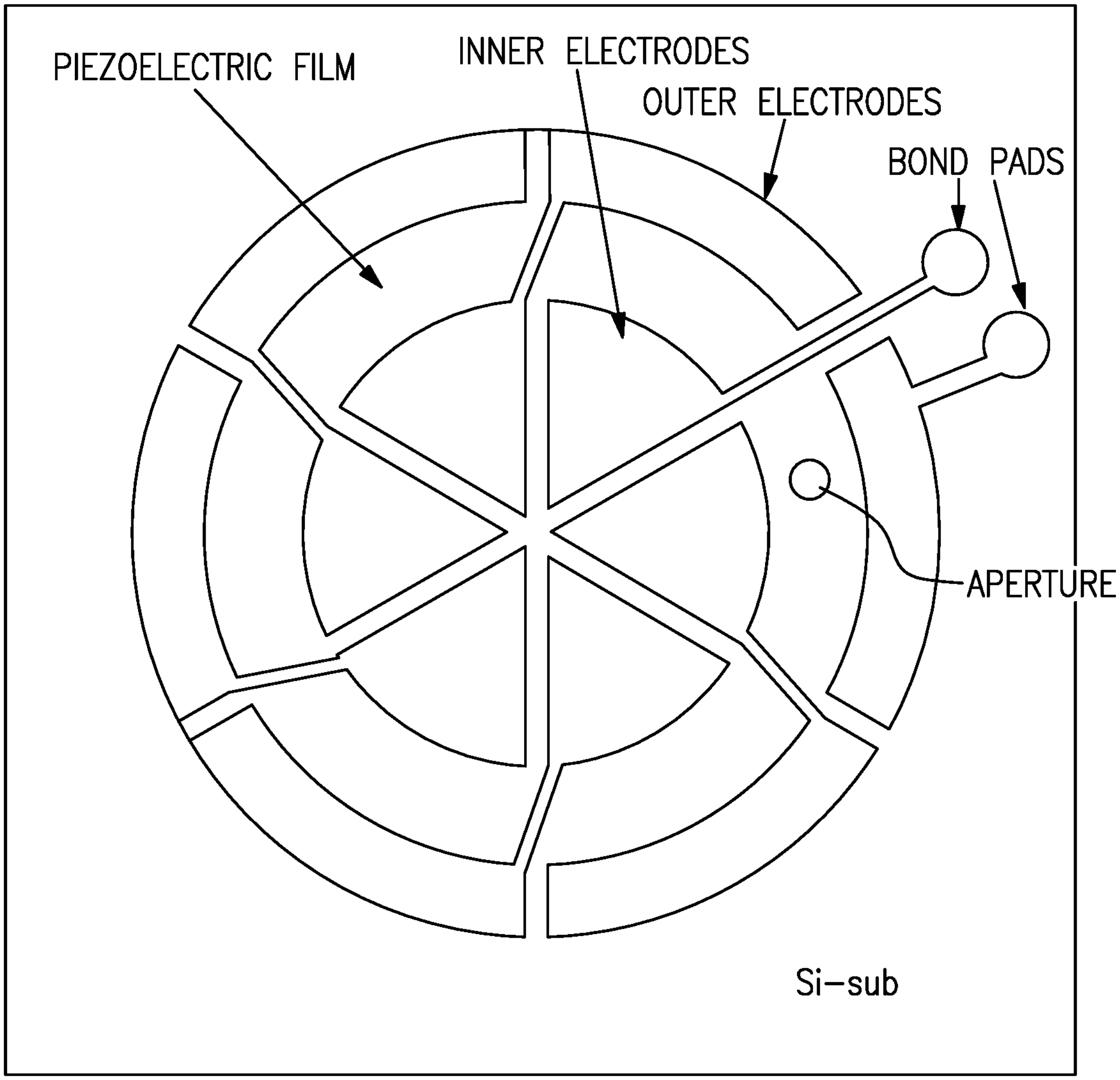
FIG. 2A is a plan view of an example of a diaphragm PMM.
Figure 2B:
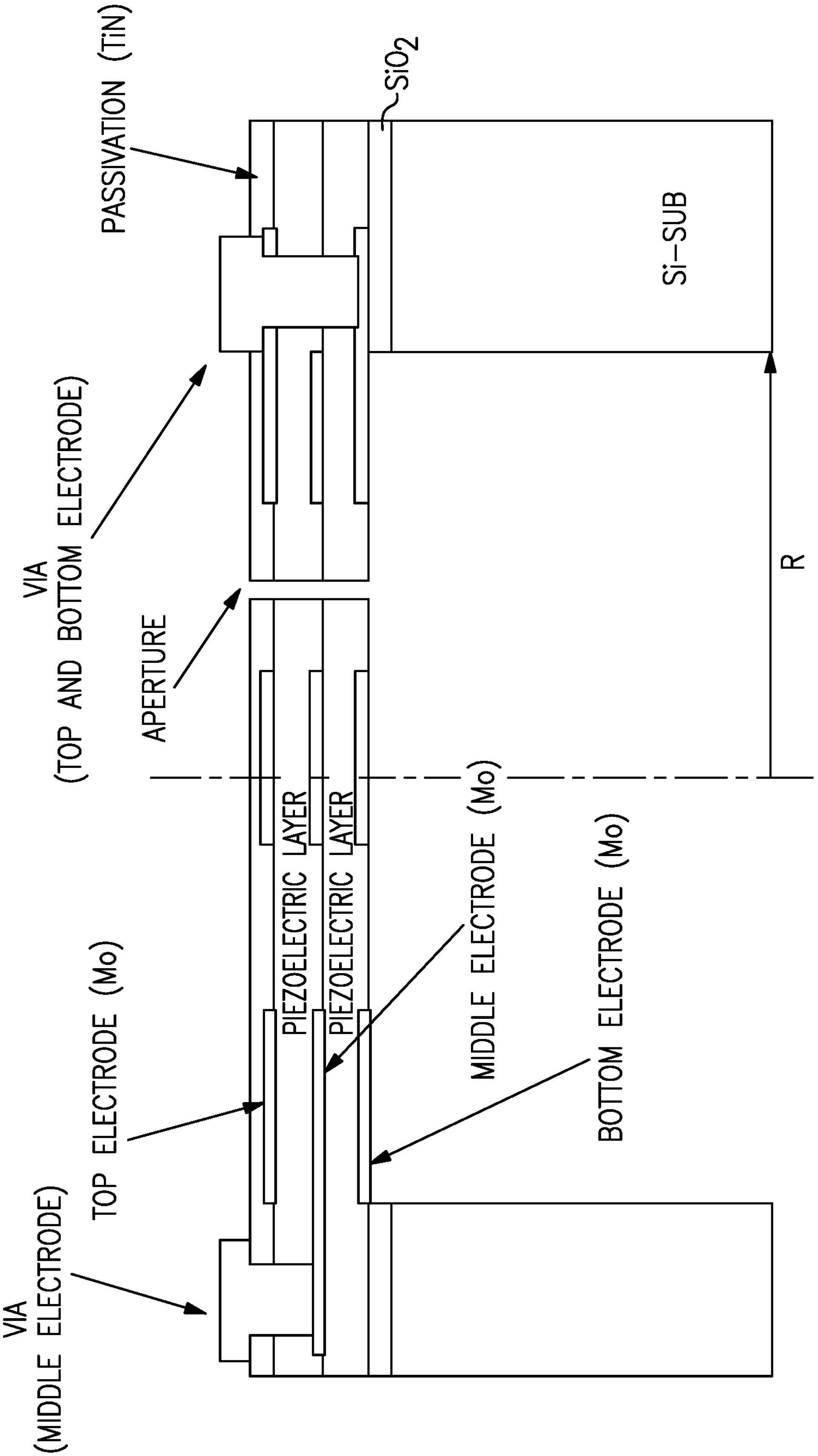
FIG. 2B is a cross-sectional view of the diaphragm PMM of FIG. 2A.

An example of a diaphragm-type piezoelectric microelectromechanical system microphone (PMM) is illustrated in a plan view in FIG. 2A and in cross-sectional view in FIG. 2B.

The diaphragm of the PMM may be formed of or include a film of piezoelectric material, for example, aluminum nitride (AlN), zinc oxide (ZnO), or PZT, (also referred to herein as a piezoelectric element) that generates a voltage difference across different portions of the diaphragm when the diaphragm deforms or vibrates due to the impingement of sound waves on the diaphragm. Although illustrated as circular in FIG. 2A, the diaphragm may have a circular, rectangular, or polygonal shape. In the example of FIGS. 2A and 2B, the diaphragm structure is fully clamped all around its perimeter by adhesion of the entire perimeter of the diaphragm to a layer of $SiO_2$ disposed on a Si substrate. To improve low-frequency roll-off control ($f_{-3\ dB}$ control) one or more vent holes or apertures may be formed in the diaphragm structure that may be well defined by photolithography.

The diaphragm PMM of FIGS. 2A and 2B has a circular diaphragm formed of two layers of piezoelectric material, for example, AlN, that is clamped at its periphery on layers of $SiO_2$ formed on a Si substrate with a cavity defined in the substrate below the diaphragm. The circular diaphragm PMM includes a plurality of pie-piece shaped sensing/active inner electrodes disposed in the central region of the diaphragm that are segmented and separated from one another by gaps. Outer sensing/active electrodes, segmented and separated circumferentially from one another by gaps, are positioned proximate a periphery of the diaphragm and extend inward from the clamped periphery a portion of the radius of the diaphragm toward the inner electrodes. Each outer sensing electrode is directly electrically connected to a corresponding inner sensing electrode by an electrical trace or conductor segment. Open areas that are free of sensing/active electrodes are defined between the inner electrodes and outer electrodes.

The inner electrodes and outer electrodes each include top or upper electrodes disposed on top of an upper layer of piezoelectric material of the diaphragm and bottom or lower electrodes disposed on the bottom of the lower layer of piezoelectric material of the diaphragm. In some embodiments, as illustrated in FIG. 2B, the inner electrodes and outer electrodes may further include middle electrodes disposed between the upper and lower layers of piezoelectric material. The multiple inner and outer electrodes are electrically connected in series between the two bond pads, except for inner and outer electrode segment pairs having electrical connection directly to the bond pads. The top and bottom electrodes of each inner and outer electrode segment pair are electrically connected to the middle electrode in an adjacent inner and outer electrode segment pair in embodiments including the middle electrodes. Vias to the middle electrode of one inner and outer electrode segment pair and to the top and bottom electrodes of an adjacent inner and outer electrode segment pair are used to provide electrical connection between the bond pads and electrodes. The electrodes are indicated as being Mo, but could alternatively be Ru, Pt, or any other suitable metal, alloy, or non-metallic conductive material.

Diaphragm structures generate maximum stress and piezoelectric charges in the center and near the edge of the diaphragm anchor. The charges in the center and edge have opposite polarities. Additionally, diaphragm structures generate piezoelectric charges at the top and the bottom surfaces and the charge polarities are opposite on the top and bottom surfaces in the same area. Partial sensing electrodes in the diaphragm center and near the anchor may be used for maximum output energy and sensitivity and to minimize parasitic capacitance.

A diaphragm PMM may include one, two, or multiple piezoelectric material film layers in the diaphragm. In embodiments including two piezoelectric material film layers, conductive layers forming sensing/active electrodes may be deposited on the top and the bottom of the diaphragm, as well as between the two piezoelectric material film layers, forming a bimorph diaphragm structure. Partial sensing electrodes may be employed. Inner electrodes may be placed in the center of diaphragm and outer electrodes may be placed near the anchor/perimeter of the diaphragm. Sensing/active electrodes may be placed on the bottom and top, and in the middle of the vertical extent of the multi-layer piezoelectric film forming the diaphragm. The size of the sensing/active electrodes may be selected to collect the maximum output energy ($E=0.5*C*V^2$).

The packaging and assembly methods and structures disclosed herein may be utilized with either cantilever or diaphragm type PMMs or capacitive MEMS microphones.

Figure 3:
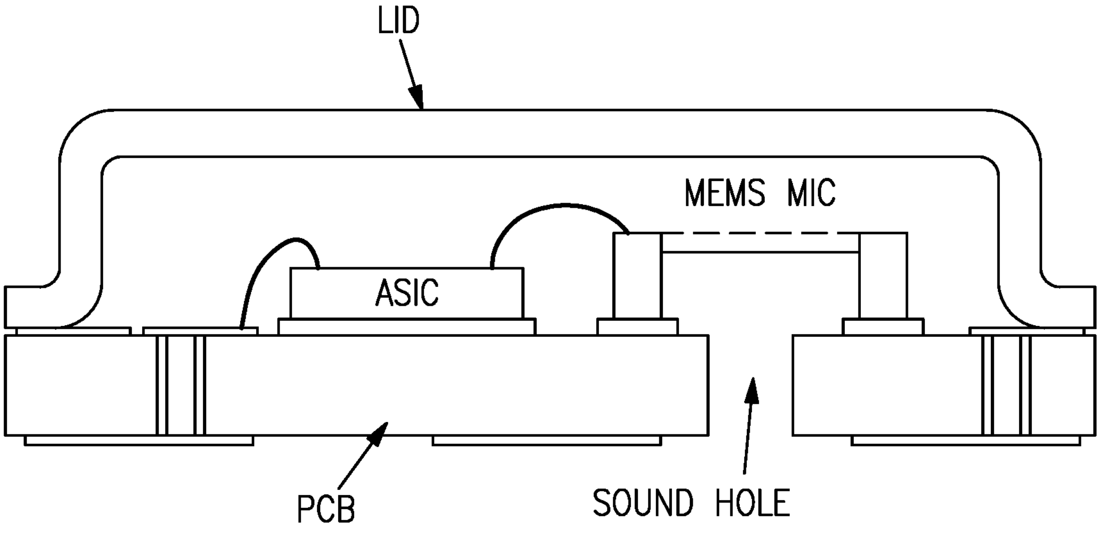
FIG. 3 illustrates an example of a bottom-port packaging structure for a PMM.
Figure 4A:
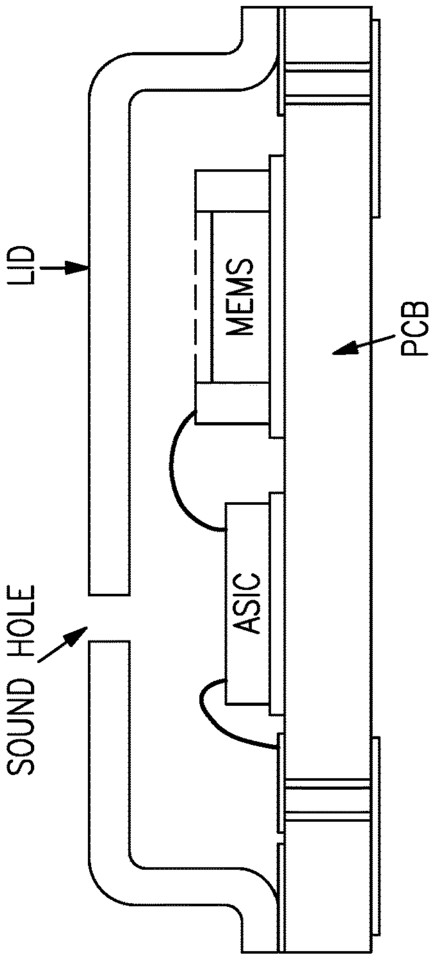
FIG. 4A illustrates an example of a top-port packaging structure for a PMM.
Figure 4B:
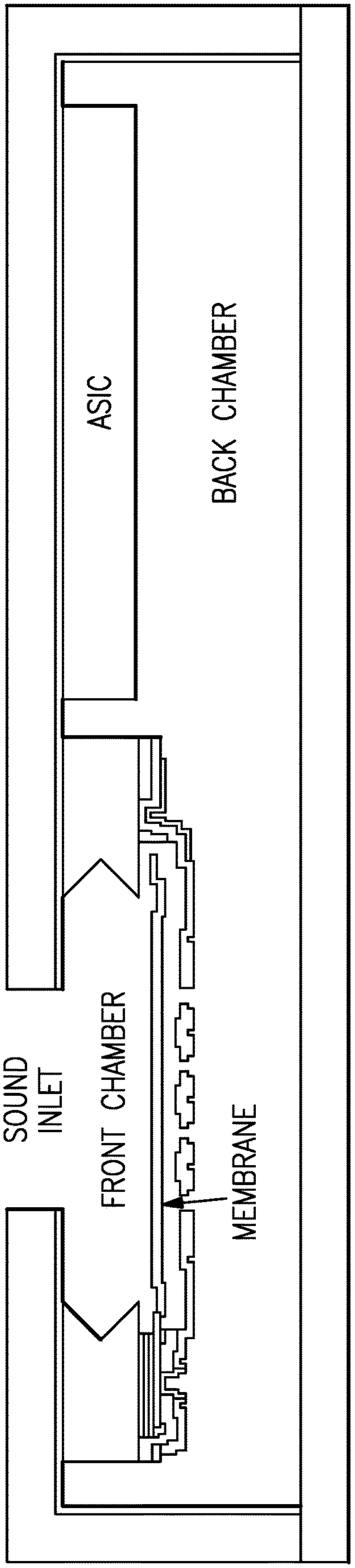
FIG. 4B illustrates another example of a top-port packaging structure for a PMM.

MEMS microphone packages typically have a hole defining a sound inlet to allow sound to reach the membrane of the MEMS microphone. The sound inlet can be located either on the bottom next to solder pads of the MEMS package (bottom-port, as shown in FIG. 3) or in the lid (top-port, as shown in FIGS. 4A and 4B). Bottom port microphones also include a hole in the circuit board they are mounted on to allow sound to reach the sound inlet. The choice of whether to use a top-port or bottom-port microphone is usually determined by factors such as the location of the microphone in a product and manufacturing considerations, among other considerations.

Performance can also be a major factor in microphone port selection since top-port microphones have traditionally had poorer performance than equivalent bottom-port microphones. The reason is that bottom-port MEMS microphones typically have larger back cavity volumes.

An example of a bottom-port PMM package is illustrated in FIG. 3. The PMM is mounted on a printed circuit board (PCB), often along with an application specific integrated circuit (ASIC) with control circuitry for the PMM and covered by a lid that may be formed of metal. A sound hole is defined in the PCB for sound to reach the PMM membrane.

An example of a top-port PMM package is illustrated in FIG. 4A. The top-port package is similar to the bottom-port package, but the sound port is defined in the lid rather than in the PCB. A variation of a top-port package to provide a higher back volume for higher performance at the cost of higher packaging complexity is shown in FIG. 4B, in which the PMM and ASIC are mounted on the lid, which is formed of a laminate such as a PCB that is attached to a bottom PCB by walls also formed of laminate material.

MEMS microphones are used in many products. In some products, it is preferred to have the acoustic port at the side to reduce the size or assembly complexity. However, since only top-port and bottom-port microphones are widely available, it requires extra effort to do so.

Figure 5A:
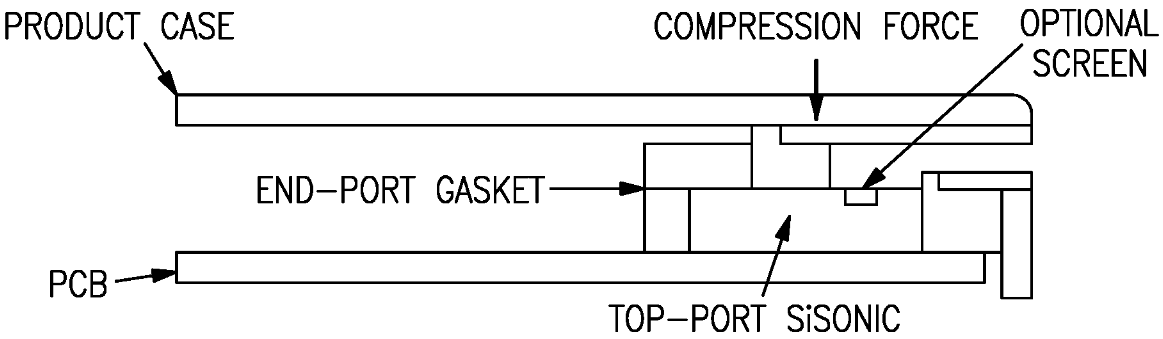
FIG. 5A illustrates an example of a top-port packaging structure for a PMM mounted within the casing of a device.

In one example, as shown in FIG. 5A, a top-port microphone needs extra gasket material and higher assembly complexity to shift the acoustic port to the side or the product.

Figure 5B:
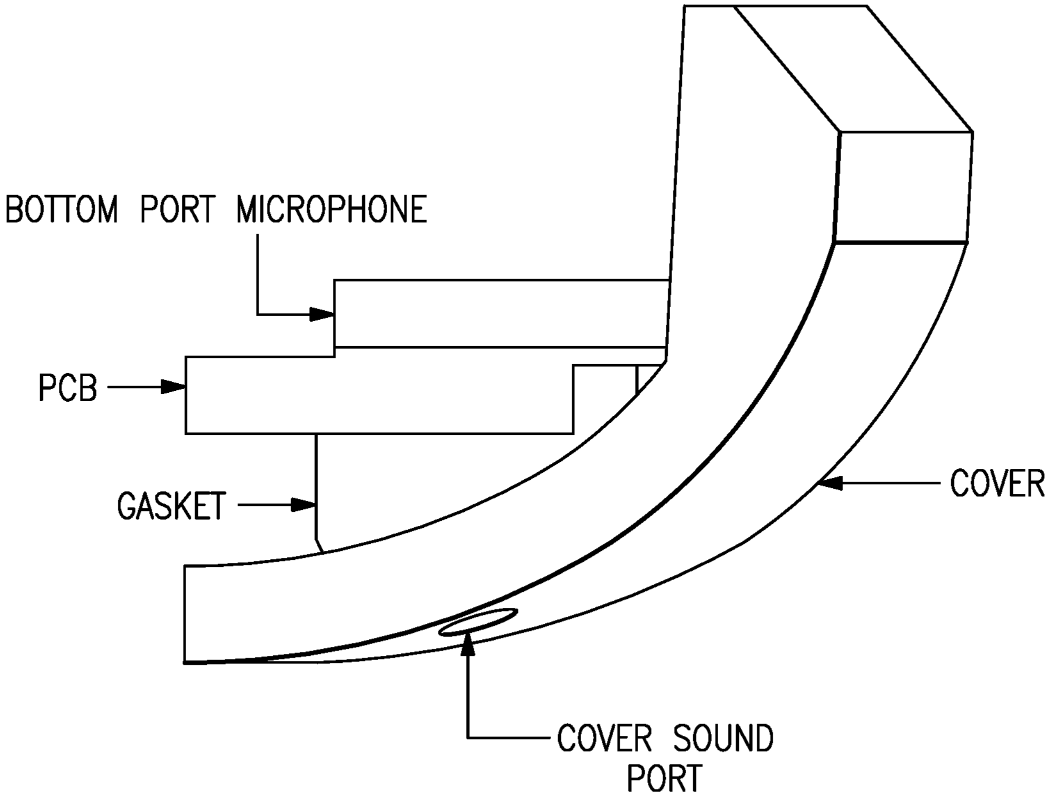
FIG. 5B illustrates an example of a bottom-port packaging structure for a PMM mounted within the casing of a device.
Figure 5C:
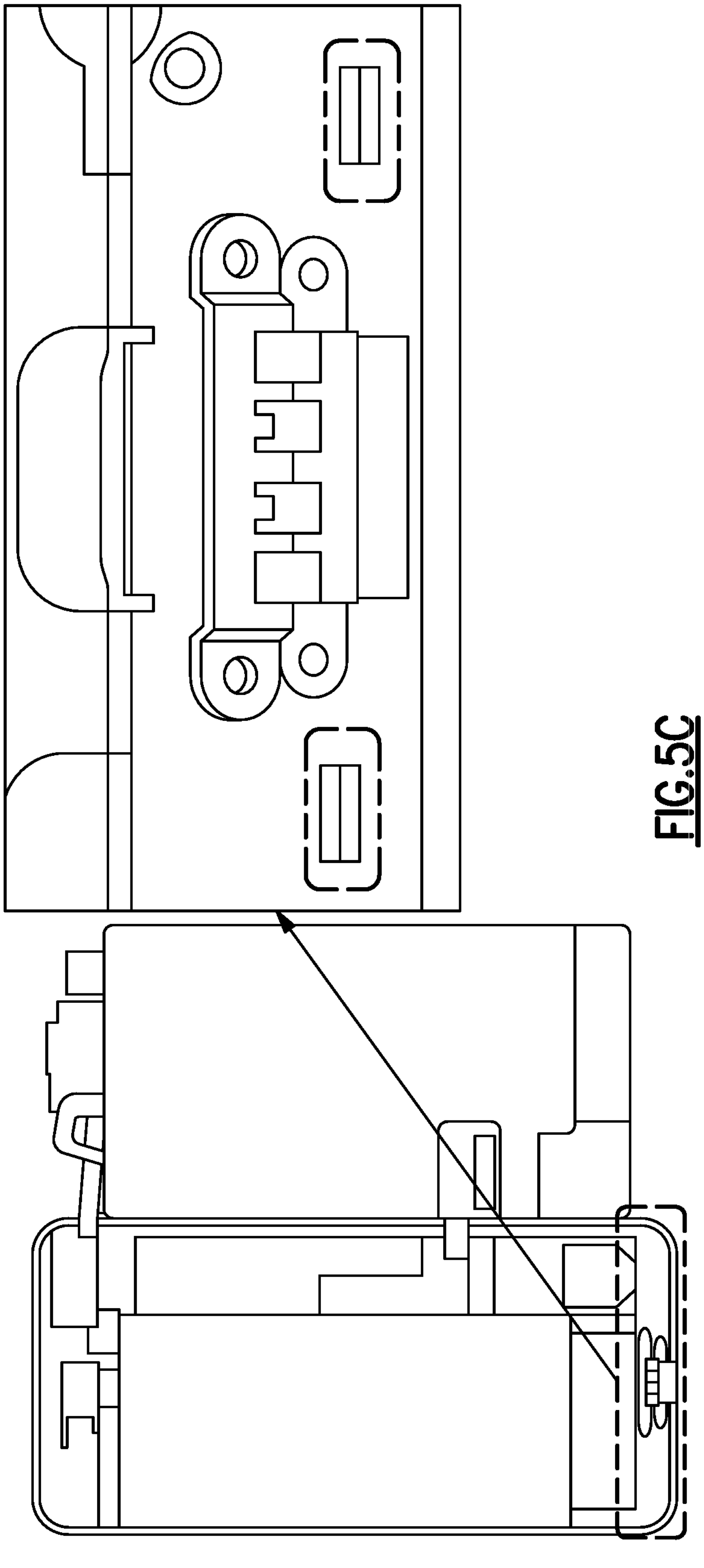
FIG. 5C illustrates an example of a bottom-port PMM mounted within the casing of a device.

In another example, as shown in FIGS. 5B and 5C, bottom-port microphone is placed with the acoustic port facing the side the phone. For MEMS microphones, the width and length are generally more than 3 times larger than the thickness. Therefore, this placement makes it difficult to reduce the phone thickness, as shown in FIG. 5C.

Aspects and embodiments disclosed herein include several structures to realize the idea of side-port MEMS microphones. Features of the disclosed aspects and embodiments may include that the package is made by a PCB and a cap die. The cap die, along with an extra cavity in the MEMS die, provides a large back volume for the PMM microphone. The MEMS die may include a side opening to allow sound to enter from the side. An ASIC can be placed in the extra space in the package.

Figure 6:
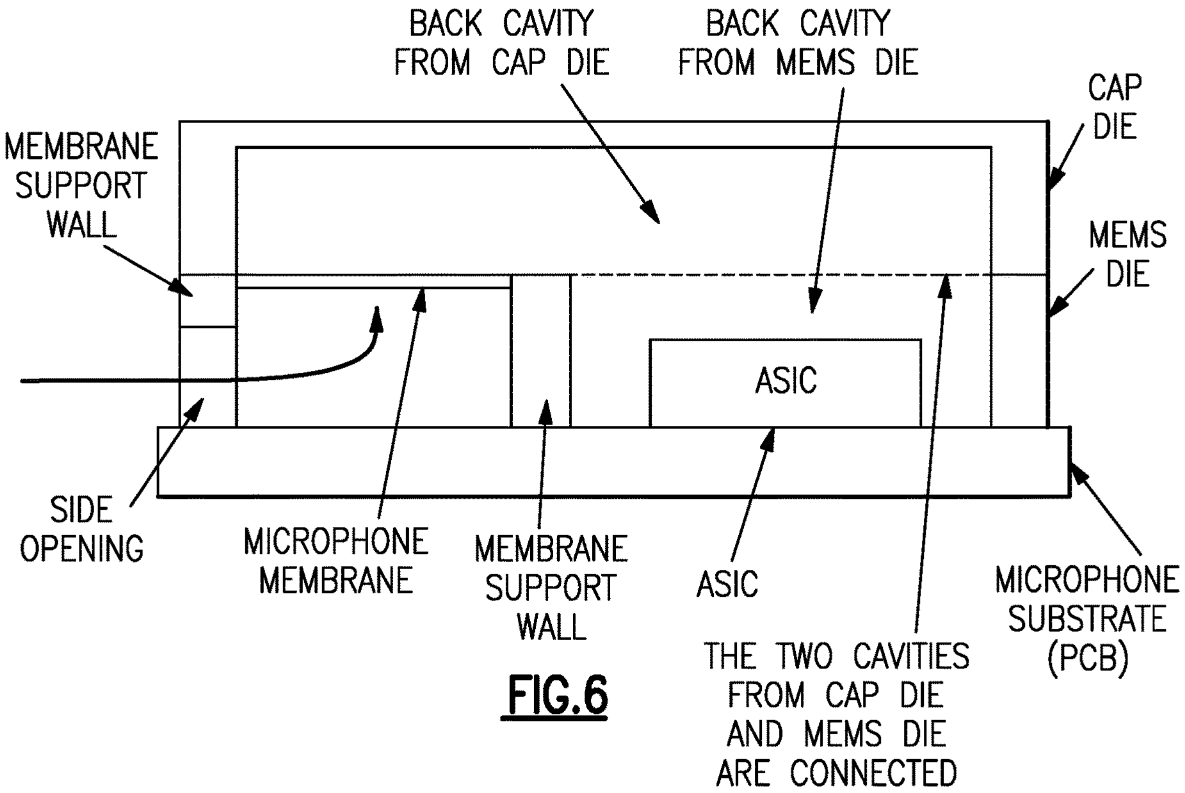
FIG. 6 illustrates an example of a side-port PMM package.

One embodiment of a side-port PMM is illustrated in cross-section in FIG. 6. The side-port PMM of FIG. 6 includes a PMM formed from a MEMS die. The PMM may be a cantilever type PMM, a diaphragm type PMM, or a capacitive microphone. The PMM includes a piezoelectric material membrane that is attached at its edges to a support wall, for example, a Si substrate coated with a layer of $SiO_2$ as illustrated in the examples of the cantilever type PMM and diaphragm type PMM in FIGS. 1B and 2B, respectively. The MEMS die may be mounted on a microphone substrate which may be a laminate substrate or printed circuit board. A cap die, which may be formed of, for example, a semiconductor material such as silicon or a dielectric material, for example, a silicon wafer, is mounted to the top of the MEMS die above the PMM. The cap die and MEMS die may be bonded by anodic bonding, with solder, or by any other bonding method known in the art. Cavities defined in the MEMS die and the cap die, along with the upper surface of the microphone substrate, together define the back cavity for the PMM. A side port for the PMM is defined by an opening provided in a portion of the support wall of the PMM. The opening in the portion of the support wall serves as the acoustic port and forms an acoustic path for the side-port PMM. Sound from the environment outside of the side-port PMM may pass through the opening and travel to the microphone membrane as illustrated by the arrow in FIG. 6. An ASIC that may include control or sensing circuitry for the PMM may be disposed within the cavity defined by the microphone substrate, MEMS die, and cap die and may be mounted on the microphone substrate.

Figure 7A:
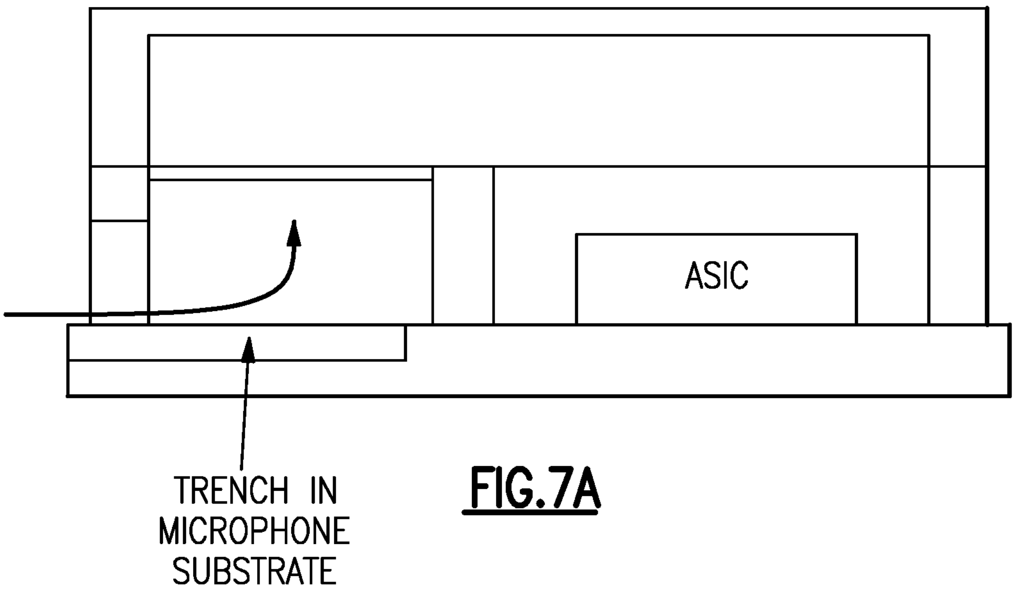
FIG. 7A illustrates another example of a side-port PMM package.

In a modification to the side-port PMM of FIG. 6, the side port/acoustic path may be increased in cross-sectional area by removing a portion of the upper side of the microphone substrate beneath the opening in the support wall of the PMM to define a trench in the upper surface of the microphone substrate as illustrated in FIG. 7A. The trench may extend from a position beneath the opening in the support wall and outside of the MEMS die to a position beneath the piezoelectric membrane.

Figure 8A:
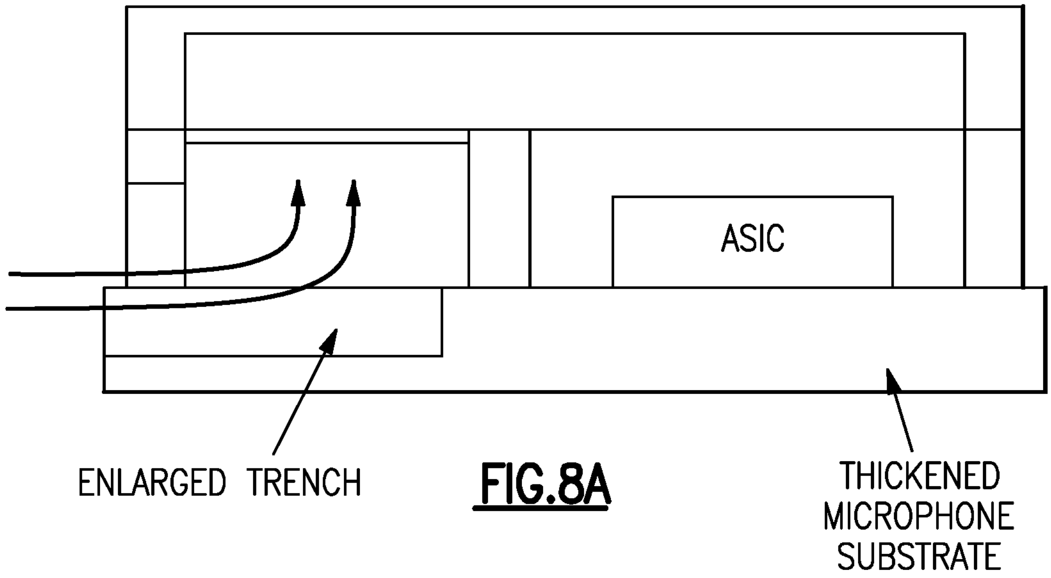
FIG. 8A illustrates another example of a side-port PMM package.

If it is desired to further increase the cross-sectional area of the side port/acoustic path, the thickness of the microphone substrate may be increased to accommodate a deeper trench as illustrated in FIG. 8A. If, however, there is a particular specification for total height of the PMM that should be met, increasing the thickness of the microphone substrate could possibly result in a decrease in height of the MEMS die or cap die to meet the thickness specification. A decrease in height of the MEMS die or cap die could reduce the volume of the back cavity of the PMM which could adversely affect performance of the PMM. Accordingly, to reclaim some or all of this lost volume, a recess may be formed in the microphone substrate in areas other than the area beneath the PMM membrane, for example, an area occupied by the ASIC as illustrated in FIG. 9A.

Figure 7B:
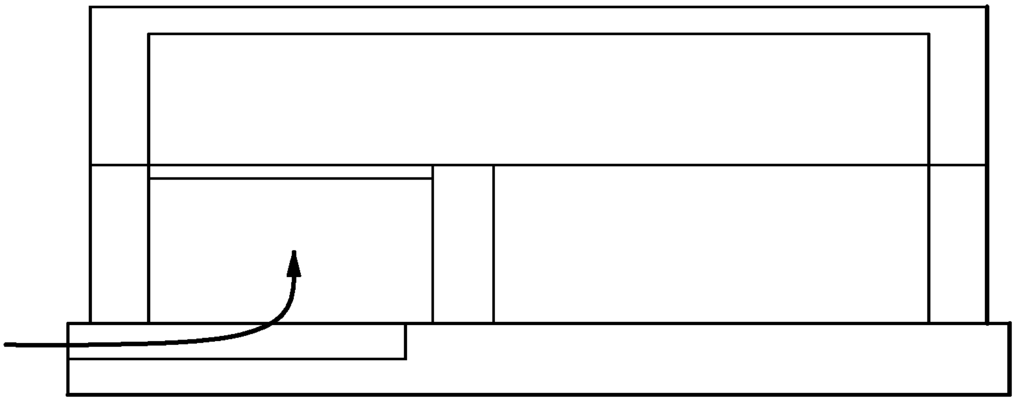
FIG. 7B illustrates another example of a side-port PMM package.
Figure 8B:
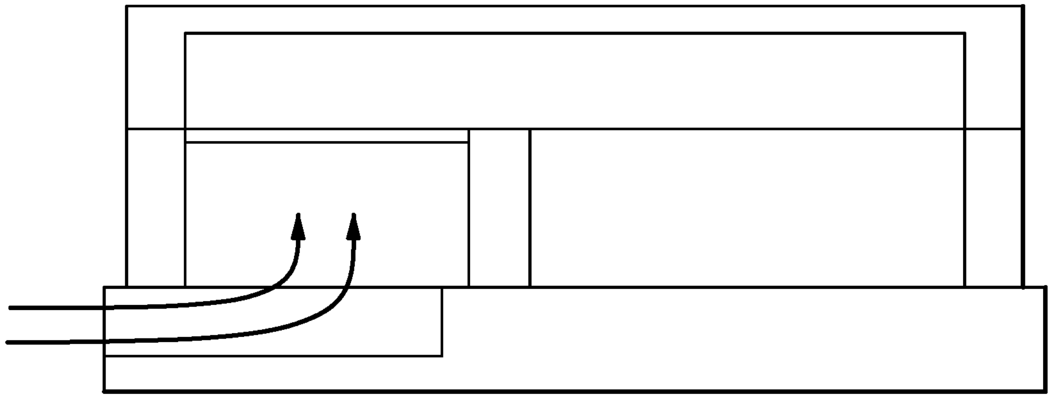
FIG. 8B illustrates another example of a side-port PMM package.
Figure 9A:
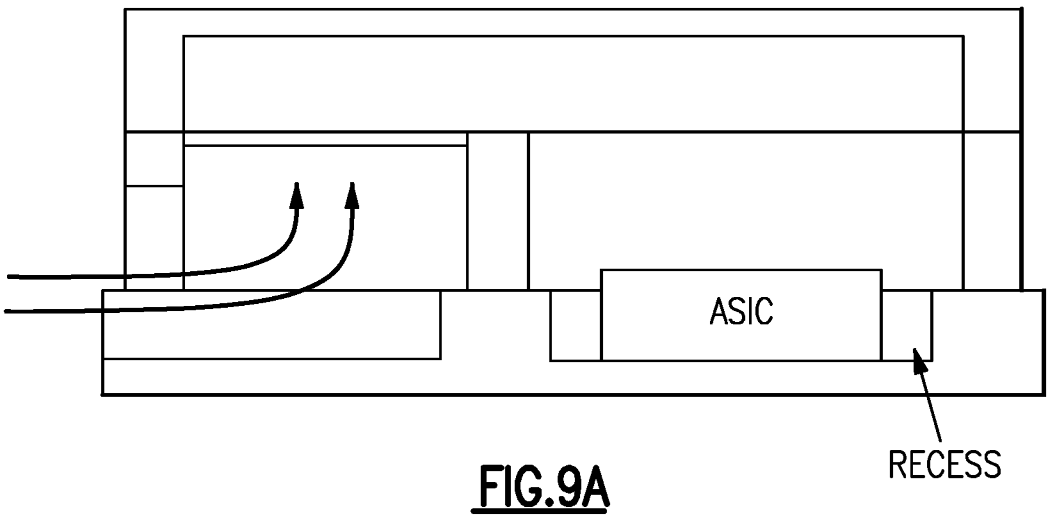
FIG. 9A illustrates another example of a side-port PMM package.
Figure 9B:
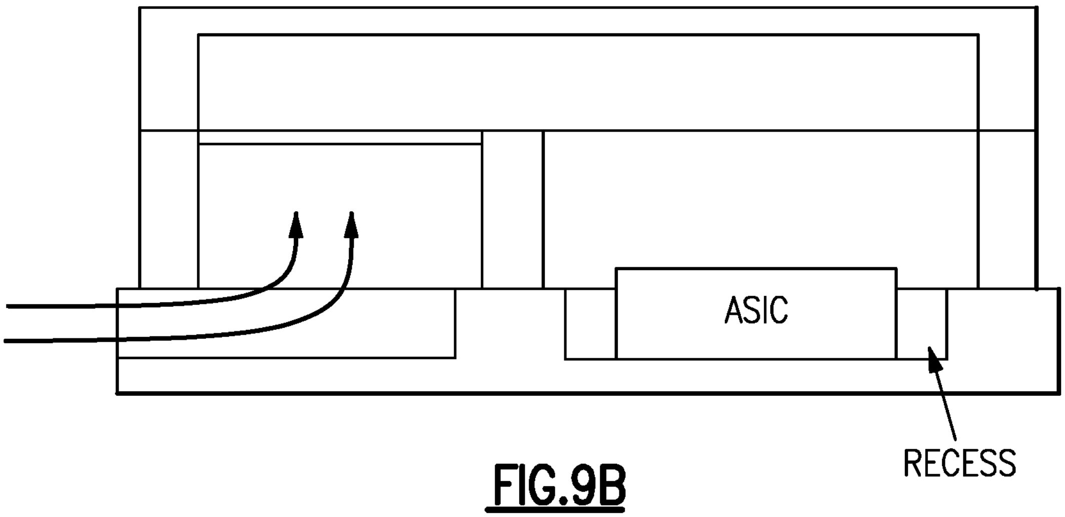
FIG. 9B illustrates another example of a side-port PMM package.

The PMM microphone structures of any of FIG. 7A, 8A, or 9A may also be formed without the side opening in the support wall of the MEMS die as illustrated in FIGS. 7B, 8B, and 9B.

Figure 10A:
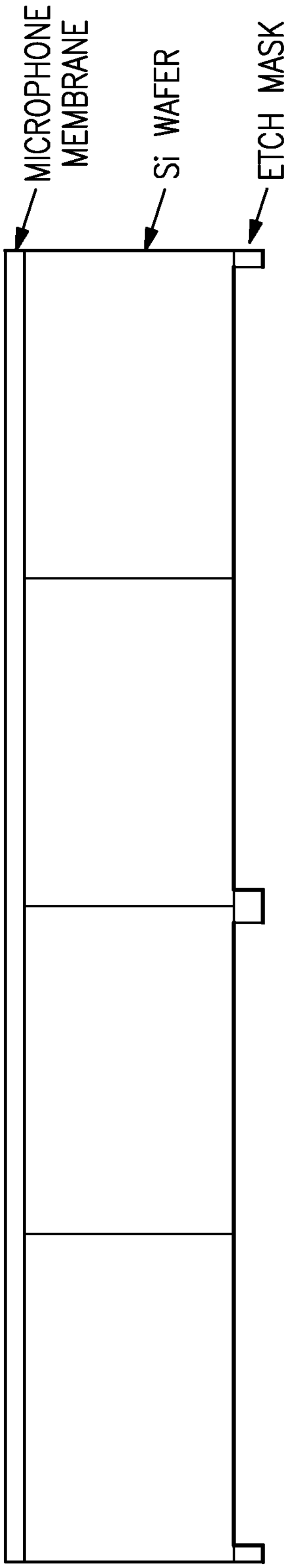
FIG. 10A illustrates an act in a method of forming a side-port PMM.
Figure 10B:
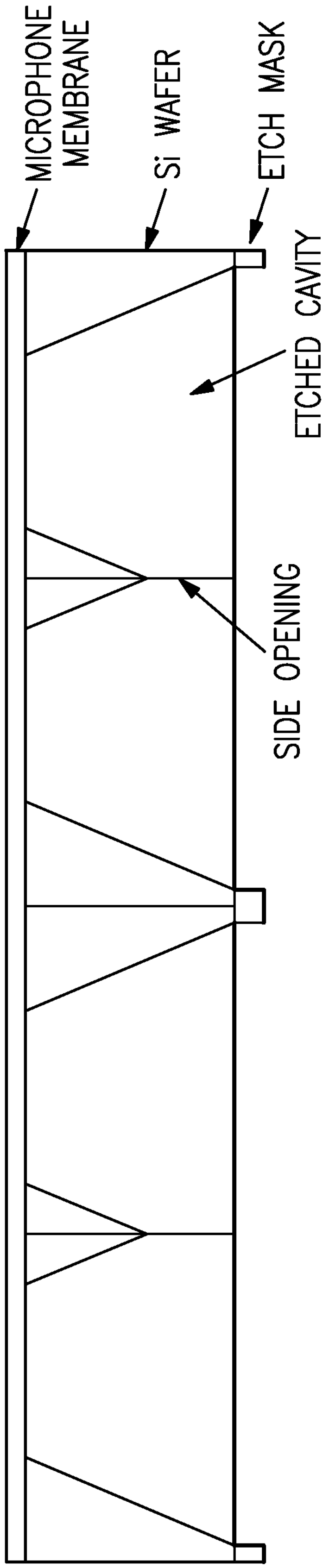
FIG. 10B illustrates another act in the method of forming the side-port PMM.

Side-port PMMs as disclosed herein may be fabricated utilizing different methods. In accordance with a first method, illustrated in FIGS. 10A and 10B (4 microphones are shown prior to singulation), a microphone membrane including a piezoelectric film and electrode stack such as that illustrated in either of FIG. 1B or 2B may be formed using methods known in the art on a support substrate, for example, a silicon wafer. An etch mask may be formed on the rear side of the support substrate. Sloped anisotropic etching may then be performed from the rear sides of the substrate until the lower sides of the microphone membranes are exposed. The portions of the rear side of the support substrate covered by the etch mask will have full height walls which would surround the majority of the microphone membranes. The portions of the support substrate lacking the etch mask will be partially etched, forming a portion of the wall around the microphone membrane with a lower side opening that will act as the side-port for the PMM.

Figure 11A:
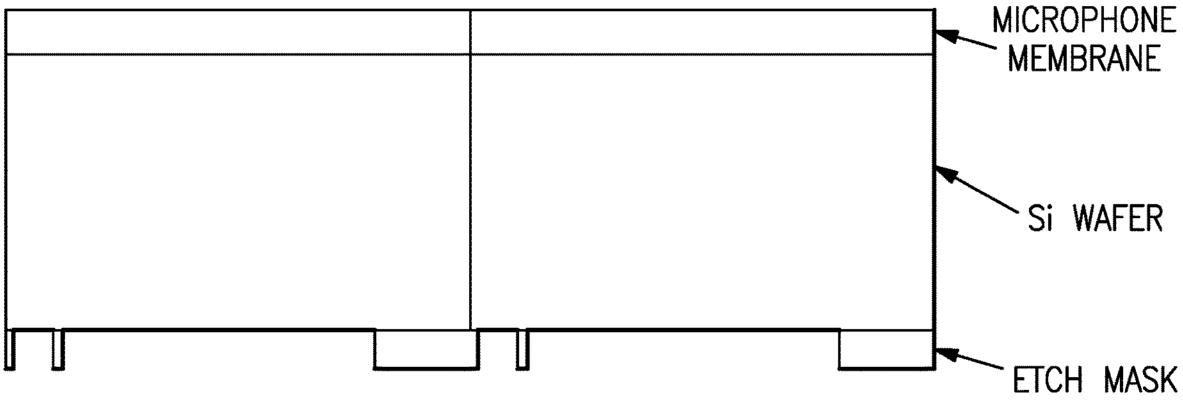
FIG. 11A illustrates an act in a second method of forming a side-port PMM.
Figure 11B:
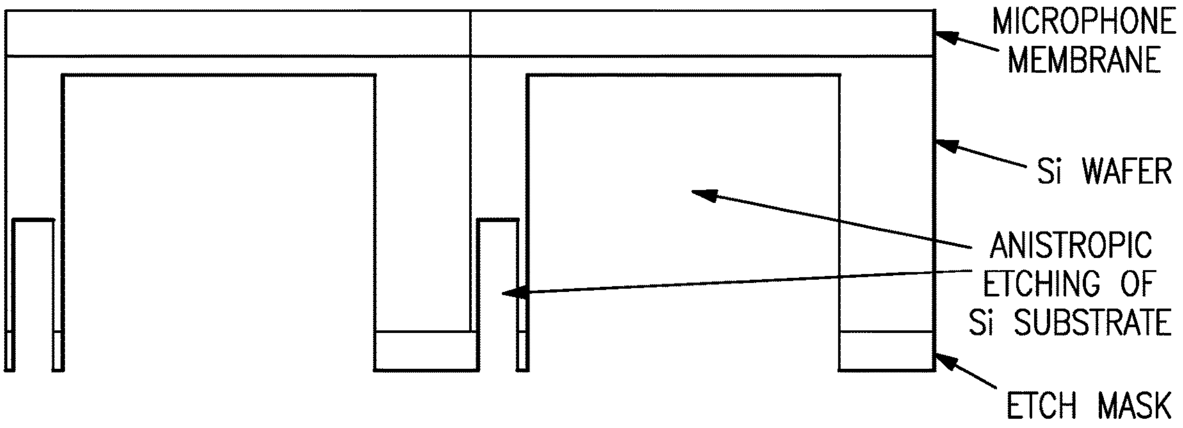
FIG. 11B illustrates another act in the second method of forming the side-port PMM.
Figure 11C:
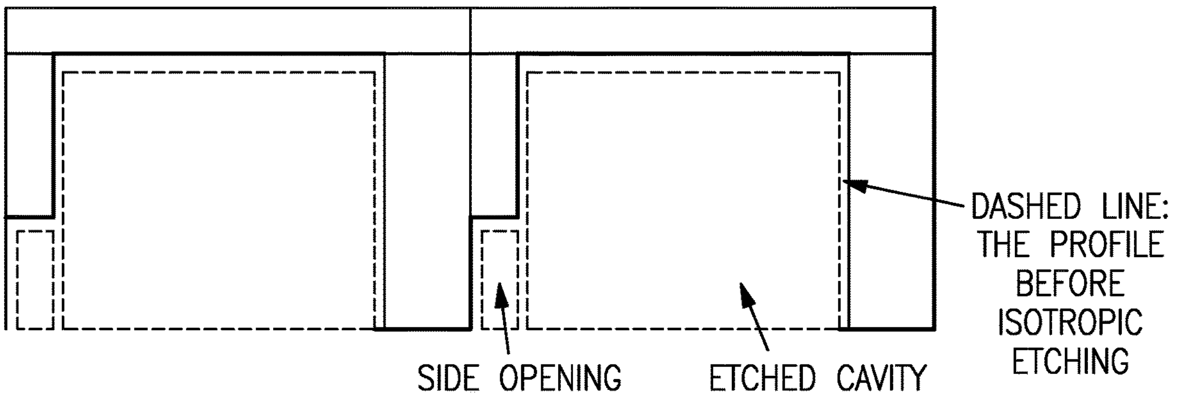
FIG. 11C illustrates another act in the second method of forming the side-port PMM.

Another method of fabricating side-port PMMs as disclosed herein is illustrated in FIGS. 11A-11C (2 microphones are shown prior to singulation). Like the previously discussed method, a microphone membrane including a piezoelectric film and electrode stack such as that illustrated in either of FIG. 1B or 2B may be formed using methods known in the art on a support substrate, for example, a silicon wafer. An etching mask is then formed at the back of the wafer (FIG. 11A). Anisotropic etching of silicon is performed from the rear of the wafer, and is terminated while a small amount of the silicon remains below the microphone membranes (FIG. 11B). Optionally, this etch step may be performed leaving no silicon below the microphone membranes. The etching rate will be slower for small cavities defined by the etching mask than for larger cavities. The etching mask is removed and isotropic etching of the silicon wafer is performed to remove the silicon remaining between small and large cavities. The small and large cavities will merge together with the regions defining the smaller cavies becoming the side ports for the PMMs (FIG. 11C).

Figure 12A:
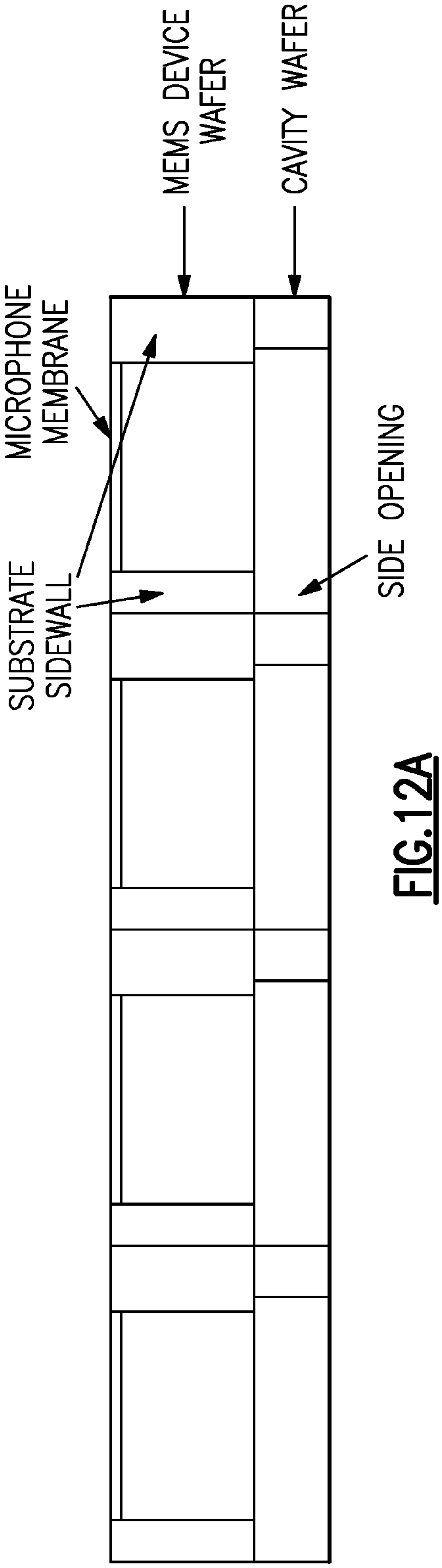
FIG. 12A illustrates an act in a third method of forming a side-port PCB.
Figure 12B:
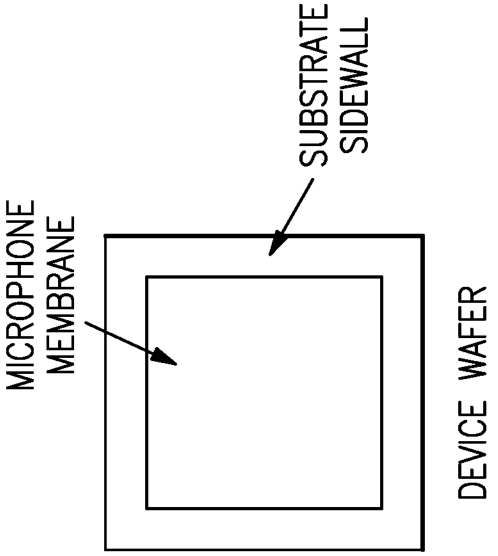
FIG. 12B is a plan view from the bottom of a device substrate used in the method illustrated in FIG. 12A.
Figure 12C:
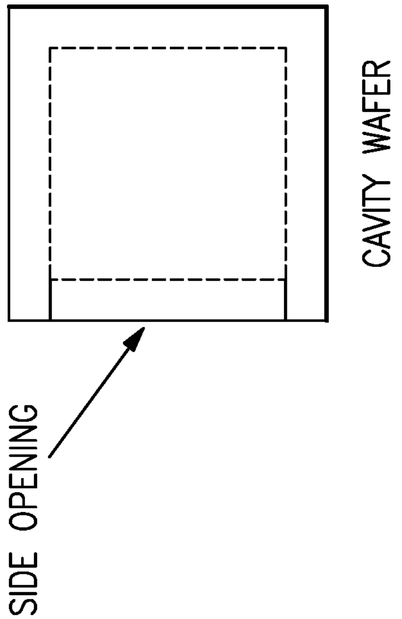
FIG. 12C is a plan view from the bottom of a cavity substrate used in the method illustrated in FIG. 12A.

Another method of fabricating side-port PMMs as disclosed herein is illustrated in FIGS. 12A-12C (4 microphones are shown prior to singulation). In this method, a MEMS device wafer including the microphone membranes and support substrate is formed separately from a cavity wafer. The cavity wafer is then bonded to the support substrate portion of the MEMS device wafer (FIG. 12A). FIG. 12B is a plan view from the bottom of one microphone of the MEMS device wafer. FIG. 12C illustrates how the cavity wafer may include walls bonded to the majority of the perimeter of the support substrate for a PMM with at least a portion of one wall having an opening or being omitted to define the side-port of the PMM.

Figure 13:
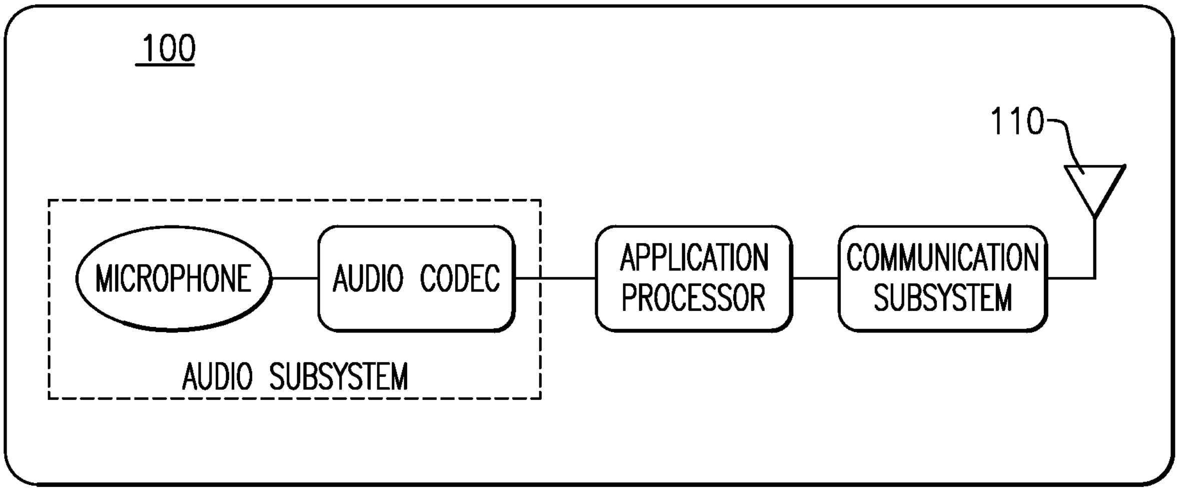
FIG. 13 is a block diagram of one example of a wireless device and that can include one or more PMMs according to aspects of the present disclosure.

Examples of MEMS microphones and assembly structures including same as disclosed herein can be implemented in a variety of packaged modules and devices. FIG. 13 is a schematic block diagrams of an illustrative device 100 according to certain embodiments.

The wireless device 100 can be a cellular phone, smart phone, tablet, modem, communication network or any other portable or non-portable device configured for voice or data communication. The wireless device 100 can receive and transmit signals from the antenna 110.

The wireless device 100 may include one or more microphones as disclosed herein. The one or more microphones may be included in an audio subsystem including, for example, an audio codec. The audio subsystem may be in electrical communication with an application processor and communication subsystem that is in electrical communication with the antenna 110. As would be recognized to one of skill in the art, the wireless device would typically include a number of other circuit elements and features that are not illustrated, for example, a speaker, an RF transceiver, baseband sub-system, user interface, memory, battery, power management system, and other circuit elements.

The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a range from about 30 kHz to 10 GHz, such as in the X or Ku 5G frequency bands.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A side-port piezoelectric microelectromechanical system microphone package comprising:

a microphone substrate;

a microelectromechanical system die disposed on the microphone substrate and including a microphone membrane and a membrane support substrate, the microphone membrane being disposed on an upper surface of a wall of the membrane support substrate;

an acoustic port defined by an aperture passing through a portion of the wall of the membrane support substrate;

a cap die including a cap die cavity and bonded directly to an upper side of the microelectromechanical system die and bonded directly to the upper surface of the wall of the membrane support substrate; and a back cavity for the package, the back cavity being defined by an upper surface on the microphone substrate, a microelectromechanical system die cavity defined between walls of the microelectromechanical system die, and the cap die cavity.

2. The package of claim 1 wherein the cap die is formed of a semiconductor material.

3. The package of claim 1 wherein the microphone substrate includes a printed circuit board.

4. The package of claim 3 further comprising a trench defined in an upper surface of the microphone substrate and defining a portion of an acoustic path from the acoustic port to an environment external to the package.

5. The package of claim 4 further comprising an application specific integrated circuit disposed on the microphone substrate within a recess defined in the microelectromechanical system die.

6. The package of claim 5 wherein the recess is defined in the upper surface the microphone substrate.

7. An electronic device module including the package of claim 1.

8. An electronic device including the electronic device module of claim 7.

9. A telephone including the electronic device module of claim 7.

10. The package of claim 1 wherein a portion of a sidewall of the cap die is disposed on an upper surface of a portion of the wall of the membrane support substrate.

11. The package of claim 1 wherein a portion of a sidewall of the cap die is disposed on an upper surface of a portion of the microelectromechanical system die.

12. The package of claim 1 wherein an inner side of the wall of the membrane support substrate is tapered.

13. A side-port piezoelectric microelectromechanical system microphone package comprising:

a microphone substrate;

a microelectromechanical system die disposed on the microphone substrate and including a microphone membrane and a membrane support substrate, the microphone membrane being disposed on an upper surface of a wall of a membrane support substrate;

an acoustic port including a trench defined in an upper surface of the microphone substrate and extending from a region below and to a side of the microelectromechanical system die to a front cavity of the package;

a cap die including a cap die cavity and bonded directly to an upper side of the microelectromechanical system die and bonded directly to the upper surface of the wall of the membrane support substrate; and a back cavity for the package, the back cavity being defined by the upper surface on the microphone substrate, a microelectromechanical system die cavity defined between walls of the microelectromechanical system die, and the cap die cavity.

14. The package of claim 13 wherein the cap die is formed of one of a dielectric or a semiconductor material.

15. The package of claim 13 wherein the microphone substrate includes a printed circuit board.

16. The package of claim 15 further comprising an application specific integrated circuit disposed on the microphone substrate within a recess defined in the microelectromechanical system die.

17. The package of claim 16 wherein the recess is defined in the upper surface the microphone substrate.

* * * * *